(12) United States Patent
Shi et al.

(10) Patent No.: US 12,185,121 B2
(45) Date of Patent: Dec. 31, 2024

(54) COMMUNICATION METHOD AND COMMUNICATION APPARATUS

(71) Applicant: Huawei Technologies Co., Ltd., Shenzhen (CN)

(72) Inventors: Xiaoli Shi, Shanghai (CN); Henrik Olofsson, Kista (SE); Hongzhuo Zhang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 355 days.

(21) Appl. No.: 17/733,240

(22) Filed: Apr. 29, 2022

(65) Prior Publication Data
US 2022/0264314 A1    Aug. 18, 2022

Related U.S. Application Data

(63) Continuation of application No. PCT/CN2019/115368, filed on Nov. 4, 2019.

(51) Int. Cl.
*H04W 16/18* (2009.01)
*H04W 48/16* (2009.01)

(52) U.S. Cl.
CPC ........... *H04W 16/18* (2013.01); *H04W 48/16* (2013.01)

(58) Field of Classification Search
CPC ..... H04W 16/18; H04W 48/16; H04W 24/02; H04W 84/047; H04W 88/085
See application file for complete search history.

(56) References Cited

U.S. PATENT DOCUMENTS

| 10,015,703 B2 * | 7/2018 | Futaki ............... H04W 36/0083 |
| 11,252,616 B2 | 2/2022 | Liu et al. |

(Continued)

FOREIGN PATENT DOCUMENTS

| CN | 107148086 A | 9/2017 |
| CN | 108924894 A | 11/2018 |

(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15)," 3GPP TS 36.300 V15.7.0, Sep. 2019, 365 pages.

"(TP for NR BL CR for TS 38.401): Cell State in gNB-CU and gNB-DU," Agenda Item: 31.3.1.16, Source: NEC, Document for: Discussion and Decision, 3GPP TSG-RAN WG3 #101bis, R3-185710, Chengdu, China, Oct. 8-12, 2018, 4 pages.

(Continued)

*Primary Examiner* — Kenneth T Lam
(74) *Attorney, Agent, or Firm* — Slater Matsil, LLP

(57) ABSTRACT

This application provides a communication method and a communication apparatus, to implement transmission of a cell coverage state indicator in a centralized unit-distributed unit (CU-DU) split architecture, which improves network performance. The communication method includes: A distributed unit DU of a first network device determines a first coverage indicator. The DU of the first network device sends the first coverage indicator and a first identifier to a centralized unit CU of the first network device, where the first coverage indicator includes one or more of the following: a cell coverage state of a first cell, a cell deployment status indicator of the first cell, and cell replacing info of the first cell, and the first identifier is used to identify the first cell.

20 Claims, 5 Drawing Sheets

(56) References Cited

U.S. PATENT DOCUMENTS

| | | | |
|---|---|---|---|
| 2016/0165468 A1* | 6/2016 | Gopalakrishnan | H04W 24/08 |
| | | | 370/252 |
| 2017/0048725 A1* | 2/2017 | Xu | H04W 24/02 |
| 2019/0215700 A1* | 7/2019 | Sofuoglu | H04W 16/26 |
| 2021/0314783 A1* | 10/2021 | Yoo | H04W 24/02 |
| 2022/0110176 A1* | 4/2022 | Aghighi | H04W 36/00698 |
| 2022/0141074 A1* | 5/2022 | You | H04L 27/2666 |
| | | | 375/262 |

FOREIGN PATENT DOCUMENTS

| | | |
|---|---|---|
| CN | 110351716 A | 10/2019 |
| EP | 3934308 A1 | 1/2022 |
| WO | 2018205265 A1 | 11/2018 |

OTHER PUBLICATIONS

3rd Generation Partnership Project; Technical Specification Group Radio Access Network; Study on RAN-centric Data Collection and Utilization for LTE and NR (Release 16), 3GPP TR 37.816 V16.0.0, XP051754713, Jul. 2019, 35 pages.

"Cell Management During gNB-CU Configuration Update Procedure," Huawei, Rel-15, Change Request 38.401 CR 0061, Current Version: 15.5.0, 3GPP TSG-RAN WG3 Meeting #104, R3-192757, XP051732024, Reno, Nevada, U.S., May 13-17, 2019, 3 pages.

"Scope of Coverage and Capacity Optimisation Solution for NR," Agenda Item: 25.2.3.5, Source: Ericsson, Document for: Discussion, Decision, 3GPP TSG-RAN WG3 #104, XP051732329, R3-193068, 5 Pages.

* cited by examiner

COMMUNICATION METHOD AND COMMUNICATION APPARATUS

CROSS-REFERENCE TO RELATED APPLICATIONS

This application is a continuation of International Application No. PCT/CN2019/115368, filed on Nov. 4, 2019, which is hereby incorporated by reference in its entirety.

TECHNICAL FIELD

Embodiments of this application relate to the communication field, and in particular, to a communication method and a communication apparatus.

BACKGROUND

In a process of network planning and network optimization, coverage capacity optimization (CCO) is an important factor for measuring network-wide performance. In a long term evolution (LTE) system, CCO mainly resolves problems about cell coverage and capacity. Cell coverage problems that may exist on a live network include weak coverage, over coverage, overshoot coverage, and unbalanced uplink and downlink cells. For cell coverage optimization, the LTE system supports coverage state indication. That is, a base station may send a coverage state of a cell under the base station to a neighbor base station, so that the neighbor base station obtains a coverage state of the base station. The neighbor base station may adjust an antenna-related parameter and the like based on the obtained coverage state of the base station.

Currently, a communication system supports a centralized unit (CU)-distributed unit (DU) split architecture. In the CU-DU split architecture, how to indicate a cell coverage state is a problem that is not considered according to the current technology.

SUMMARY

This application provides a communication method and a communication apparatus, to implement transmission of a cell coverage state indicator in a CU-DU split architecture, which improves network performance.

According to a first aspect, a communication method is provided. The method includes: First, a distributed unit DU of a first network device determines a first coverage indicator, where the first coverage indicator includes one or more of the following: a cell coverage state of a first cell, a cell deployment status indicator of the first cell, and cell replacing info of the first cell. Then, the distributed unit DU of the first network device sends the first coverage indicator and a first identifier to a centralized unit CU of the first network device, where the first identifier is used to identify the first cell. Therefore, the DU of the first network device may determine one or more items of the first coverage indicator, and provide the first coverage indicator to the CU of the first network device, to implement transmission of a cell coverage state indicator in a CU-DU split architecture, which improves network performance.

In a possible implementation, the communication method further includes: The DU of the first network device receives a second coverage indicator and/or a second identifier from the CU of the first network device. The second coverage indicator includes one or more of the following: a cell coverage state of a second cell, a cell deployment status indicator of the second cell, and cell replacing info of the second cell, and the second identifier is used to identify the second cell. Herein, the second coverage indicator is a coverage indicator of a neighbor cell. The second cell represents a neighbor cell of the first cell.

That is, the DU of the first network device may obtain the cell coverage indicator of the neighbor cell from the CU of the first network device.

Optionally, the second coverage indicator or the second identifier or both are obtained by the CU of the first network device from the neighbor cell. For example, the CU of the first network device receives the second coverage indicator and/or the second identifier from a CU of a second network device. The second network device is a neighbor base station.

Optionally, the first coverage indicator includes the cell coverage state of the first cell, the cell deployment status indicator of the first cell, and the cell replacing info of the first cell. Therefore, the DU of the first network device may determine the cell coverage state of the first cell, the cell deployment status indicator of the first cell, and the cell replacing info of the first cell that are included in the first coverage indicator.

Optionally, the first coverage indicator includes the cell coverage state of the first cell and the cell deployment status indicator of the first cell. The communication method further includes: The DU of the first network device receives a third coverage indicator and the first identifier from the CU of the first network device, where the third coverage indicator includes the cell replacing info of the first cell. Therefore, the DU of the first network device may determine the cell coverage state of the first cell and the cell deployment status indicator of the first cell that are included in the first coverage indicator, and obtain the cell replacing info of the first cell included in the first coverage indicator from the CU of the first network.

According to a second aspect, a communication method is provided. The method includes: First, a centralized unit CU of a first network device receives a first coverage indicator and a first identifier from a distributed unit DU of the first network device, where the first coverage indicator includes one or more of the following: a cell coverage state of a first cell, a cell deployment status indicator of the first cell, and cell replacing info of the first cell, and the first identifier is used to identify the first cell. Then, the CU of the first network device manages the first cell by using the first coverage indicator. Therefore, the CU of the first network device may receive the first coverage indicator from the DU of the first network device, to implement transmission of a cell coverage state indicator in a CU-DU split architecture, which improves network performance.

In a possible implementation, the communication method further includes: The CU of the first network device sends a second coverage indicator and/or a second identifier to the DU of the first network device. The second coverage indicator includes one or more of the following: a cell coverage state of a second cell, a cell deployment status indicator of the second cell, and cell replacing info of the second cell. The second identifier is used to identify the second cell. Herein, the second coverage indicator is a coverage indicator of a neighbor cell. The second cell represents a neighbor cell of the first cell.

In other words, the CU of the first network device may send the cell coverage indicator of the neighbor cell to the DU of the first network device.

Optionally, the second coverage indicator or the second identifier or both are obtained by the CU of the first network device from the neighbor cell. After obtaining the coverage indicator of the neighbor cell, the CU of the first network device may adjust an antenna-related parameter and the like based on the coverage indicator of the neighbor cell. For example, the CU of the first network device receives the second coverage indicator and/or the second identifier from a CU of a second network device. The second network device is a neighbor base station.

Optionally, the first coverage indicator includes the cell coverage state of the first cell, the cell deployment status indicator of the first cell, and the cell replacing info of the first cell. Therefore, the cell coverage state of the first cell, the cell deployment status indicator of the first cell, and the cell replacing info of the first cell that are included in the first coverage indicator may be determined by the DU of the first network device. The CU of the first network device receives the first coverage indicator that is determined by the DU of the first network device.

Optionally, the first coverage indicator includes the cell coverage state of the first cell and the cell deployment status indicator of the first cell. The communication method further includes: The CU of the first network device sends a third coverage indicator and the first identifier to the DU of the first network device, where the third coverage indicator includes the cell replacing info of the first cell. Therefore, the cell coverage state of the first cell and the cell deployment status indicator of the first cell that are included in the first coverage indicator is determined by the DU of the first network device. The cell replacing info of the first cell included in the first coverage indicator is determined by the CU of the first network device.

Optionally, the CU of the first network device may also send a coverage configuration of the first cell (for example, a fourth coverage indicator, where the fourth coverage indicator includes: the coverage state of the first cell, the cell deployment status indicator of the first cell, and cell replacing info of the first cell) to the CU of the second network device, so that the neighbor cell obtains the coverage configuration of the first cell, and the neighbor base station adjusts the antenna-related parameter and the like.

According to a third aspect, a communication method is provided. The method includes: First, a centralized unit CU of a first network device determines a first coverage indicator, where the first coverage indicator includes one or more of the following: a cell coverage state of a first cell, a cell deployment status indicator of the first cell, and cell replacing info of the first cell. Then, the centralized unit CU of the first network device sends the first coverage indicator and a first identifier to a distributed unit DU of the first network device, where the first identifier is used to identify the first cell. Therefore, the CU of the first network device may determine one or more items of the first coverage indicator, and provide the first coverage indicator to the DU of the first network device, to implement transmission of a cell coverage state indicator in a CU-DU split architecture, which improves network performance.

Optionally, the first coverage indicator includes the cell coverage state of the first cell, the cell deployment status indicator of the first cell, and the cell replacing info of the first cell. Therefore, the CU of the first network device may determine the cell coverage state of the first cell, the cell deployment status indicator of the first cell, and the cell replacing info of the first cell that are included in the first coverage indicator.

In a possible implementation, the communication method further includes: The CU of the first network device sends a second coverage indicator and/or a second identifier to the DU of the first network device. The second coverage indicator includes one or more of the following: a cell coverage state of a second cell, a cell deployment status indicator of the second cell, and cell replacing info of the second cell. The second identifier is used to identify the second cell. Herein, the second coverage indicator is a coverage indicator of a neighbor cell. The second cell represents a neighbor cell of the first cell. In other words, the CU of the first network device may send the cell coverage indicator of the neighbor cell to the DU of the first network device.

Optionally, the second coverage indicator or the second identifier or both are obtained by the CU of the first network device from the neighbor cell. After obtaining the coverage indicator of the neighbor cell, the CU of the first network device may adjust an antenna-related parameter and the like based on the coverage indicator of the neighbor cell.

Optionally, the communication method further includes: The CU of the first network device obtains a plurality of coverage configurations. The CU of the first network device determines the first coverage indicator for the first cell based on the plurality of coverage configurations. In other words, the CU of the first network device may select an appropriate coverage configuration, for example, the first coverage indicator, for the first cell from the plurality of coverage configurations.

Optionally, that the CU of the first network device obtains a plurality of coverage configurations includes: An operation, administration and maintenance OAM system of the CU of the first network device configures the plurality of coverage configurations for the CU of the first network device. When the OAM system of the CU and an OAM system of the DU are different OAM systems, the OAM system of the CU of the first network device may configure the plurality of coverage configurations for the CU of the first network device. Then, the CU of the first network device may select the appropriate coverage configuration, for example, the first coverage indicator, for the first cell from the plurality of coverage configurations.

Optionally, that the CU of the first network device obtains a plurality of coverage configurations includes: The CU of the first network device receives the plurality of coverage configurations from the DU of the first network device. The plurality of coverage configurations are configured for the first network device DU by an operation, administration and maintenance OAM system of the DU of the first network device. That is, when the OAM system of the CU and the OAM system of the DU are different OAM systems, the OAM system of the DU of the first network device may configure a plurality of coverage configurations for the DU of the first network device. Then, the DU of the first network device sends the plurality of coverage configurations to the CU of the first network device, and the CU of the first network device selects the appropriate coverage configuration, for example, the first coverage indicator, for the first cell from the plurality of coverage configurations.

Optionally, that a CU of a first network device determines a first coverage indicator includes: The CU of the first network device receives the first coverage indicator from the DU of the first network device, where the first coverage indicator is determined by the DU of the first network device for the first cell from a plurality of coverage configurations, and the plurality of coverage configurations are configured by an operation, administration and maintenance OAM system of the DU of the first network device for the DU of the first network device. That is, when an OAM system of the CU and the OAM system of the DU are different OAM systems, the OAM system of the DU of the first network device may configure the plurality of coverage configurations for the DU of the first network device. Then, the DU of the first network device selects an appropriate coverage configuration, for example, the first coverage indicator, for the first cell from the plurality of coverage configurations, and sends the selected coverage configuration to the CU of the first network device.

According to a fourth aspect, a communication method is provided. The method includes: First, a distributed unit DU of a first network device receives a first coverage indicator and a first identifier from a centralized unit CU of the first network device, where the first coverage indicator includes one or more of the following: a cell coverage state of a first cell, a cell deployment status indicator of the first cell, and cell replacing info of the first cell, and the first identifier is used to identify the first cell. Then, the DU of the first network device manages the first cell by using the first coverage indicator. Therefore, the DU of the first network device may receive the first coverage indicator from the CU of the first network device, to implement transmission of a cell coverage state indicator in a CU-DU split architecture, which improves network performance.

Optionally, the first coverage indicator includes the cell coverage state of the first cell, the cell deployment status indicator of the first cell, and the cell replacing info of the first cell. Therefore, the cell coverage state of the first cell, the cell deployment status indicator of the first cell, and the cell replacing info of the first cell that are included in the first coverage indicator may be determined by the CU of the first network device.

In a possible implementation, the communication method further includes: The DU of the first network device receives a second coverage indicator and/or a second identifier from the CU of the first network device. The second coverage indicator includes one or more of the following: a cell coverage state of a second cell, a cell deployment status indicator of the second cell, and cell replacing info of the second cell. The second identifier is used to identify the second cell. Herein, the second coverage indicator is a coverage indicator of a neighbor cell. The second cell represents a neighbor cell of the first cell. That is, the DU of the first network device may receive the cell coverage indicator of the neighbor cell sent by the CU of the first network device.

Optionally, the second coverage indicator or the second identifier or both are obtained by the CU of the first network device from the neighbor cell.

Optionally, the communication method further includes: An operation, administration and maintenance OAM system of the DU of the first network device configures a plurality of coverage configurations for the DU of the first network device. The DU of the first network device sends the plurality of coverage configurations to the CU of the first network device. That is, when an OAM system of the CU and the OAM system of the DU are different OAM systems, the OAM system of the DU of the first network device may configure the plurality of coverage configurations for the DU of the first network device. Then, the DU of the first network device sends the plurality of coverage configurations to the CU of the first network device, and the CU of the first network device selects an appropriate coverage configuration, for example, the first coverage indicator, for the first cell from the plurality of coverage configurations.

Optionally, the communication method further includes: An operation, administration and maintenance OAM system of the DU of the first network device configures a plurality of coverage configurations for the DU of the first network device. The DU of the first network device determines the first coverage indicator for the first cell based on the plurality of coverage configurations. The DU of the first network device sends the first coverage indicator to the CU of the first network device. That is, when an OAM system of the CU and the OAM system of the DU are different OAM systems, the OAM system of the DU of the first network device may configure the plurality of coverage configurations for the DU of the first network device. Then, the DU of the first network device selects an appropriate coverage configuration, for example, the first coverage indicator, for the first cell from the plurality of coverage configurations, and sends the selected coverage configuration to the CU of the first network device.

According to a fifth aspect, a communication apparatus is provided, including modules or units configured to perform the method in any one of the possible implementations of the first aspect or the fourth aspect.

According to a sixth aspect, a communication apparatus is provided, including modules or units configured to perform the method in any one of the possible implementations of the second aspect or the third aspect.

According to a seventh aspect, a communication apparatus is provided, including a distributed unit DU and a centralized unit CU.

In a possible design, the distributed unit DU is configured to perform any one of the first aspect or the possible implementations of the first aspect; and the centralized unit CU is configured to perform any one of the second aspect or the possible implementations of the second aspect.

Alternatively, in another possible design, the centralized unit CU is configured to perform any one of the third aspect or the possible implementations of the third aspect; and the distributed unit DU is configured to perform any one of the fourth aspect or the possible implementations of the fourth aspect.

According to an eighth aspect, a communication apparatus is provided, including a processor. The processor is coupled to a memory, and may be configured to execute instructions in the memory, to implement the method in any one of the possible implementations of the first aspect or the fourth aspect. Optionally, the communication apparatus further includes the memory. Optionally, the communication apparatus further includes a communication interface, and the processor is coupled to the communication interface.

In an implementation, the communication apparatus is a DU entity. When the communication apparatus is the DU entity, the communication interface may be a transceiver or an input/output interface.

In another implementation, the communication apparatus is a chip configured in the DU entity. When the communication apparatus is the chip configured in the DU entity, the communication interface may be the input/output interface.

Optionally, the transceiver may be a transceiver circuit. Optionally, the input/output interface may be an input/output circuit.

According to a ninth aspect, a communication apparatus is provided, including a processor. The processor is coupled to a memory, and may be configured to execute instructions in the memory, to implement the method in any one of the possible implementations of the second aspect or the third aspect. Optionally, the communication apparatus further includes the memory. Optionally, the communication apparatus further includes a communication interface, and the processor is coupled to the communication interface.

In an implementation, the communication apparatus is a CU entity. When the communication apparatus is the CU entity, the communication interface may be a transceiver or an input/output interface.

In another implementation, the communication apparatus is a chip configured in the CU entity. When the communication apparatus is the chip configured in the CU entity, the communication interface may be the input/output interface.

Optionally, the transceiver may be a transceiver circuit. Optionally, the input/output interface may be an input/output circuit.

According to a tenth aspect, a processor is provided, including an input circuit, an output circuit, and a processing circuit. The processing circuit is configured to: receive a signal via the input circuit, and transmit a signal via the output circuit, so that the processor is enabled to perform the method in any one of the possible implementations of the first aspect to the fourth aspect.

During specific implementation, the processor may be a chip, the input circuit may be an input pin, the output circuit may be an output pin, and the processing circuit may be a transistor, a gate circuit, a trigger, various logic circuits, or the like. The input signal received by the input circuit may be received and input by, for example, but not limited to, a receiver. The signal output by the output circuit may be output to, for example, but not limited to, a transmitter and transmitted by the transmitter. The input circuit and the output circuit may be a same circuit, which is used as the input circuit and the output circuit at different moments. Specific implementations of the processor and the circuits are not limited in embodiments of this application.

According to an eleventh aspect, an apparatus is provided, including a processor and a memory. The processor is configured to: read instructions stored in the memory, receive a signal through a receiver, and transmit a signal through a transmitter, to perform the method in any one of the possible implementations of the first aspect to the fourth aspect.

Optionally, there are one or more processors, and there are one or more memories.

Optionally, the memory may be integrated with the processor, or the memory and the processor may be separately disposed.

In a specific implementation process, the memory may be a non-transitory (non-transitory) memory, for example, a read-only memory (read-only memory, ROM). The memory and the processor may be integrated on a same chip, or may be separately disposed on different chips. A type of the memory and a manner of disposing the memory and the processor are not limited in this embodiment of this application.

It should be understood that, a related data exchange process such as sending indication information may be a process of outputting the indication information from the processor, and receiving capability information may be a process of receiving the input capability information by the processor. Specifically, data output by the processor may be output to the transmitter, and input data received by the processor may be from the receiver. The transmitter and the receiver may be collectively referred to as a transceiver.

The apparatus in the eleventh aspect may be a chip. The processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may exist independently outside the processor.

According to a twelfth aspect, a computer program product is provided. The computer program product includes a computer program (which may also be referred to as code or an instruction). When the computer program is run, a computer is enabled to perform the method in any one of the possible implementations of the first aspect to the fourth aspect.

According to a thirteenth aspect, a computer-readable medium is provided. The computer-readable medium stores a computer program (which may also be referred to as code or an instruction). When the computer program is run on a computer, the computer is enabled to perform the method in any one of the possible implementations of the first aspect to the fourth aspect.

According to a fourteenth aspect, a communication apparatus is provided, including the foregoing distributed unit DU and/or the centralized unit CU.

DETAILED DESCRIPTION OF ILLUSTRATIVE EMBODIMENTS

The following describes technical solutions of this application with reference to the accompanying drawings.

For example, features or content marked by dashed lines in the accompanying drawings in embodiments of this application may be understood as optional operations or optional structures of embodiments.

In embodiments of this application, "a plurality of" means two or more, and another quantifier is similar to this.

The technical solutions in embodiments of this application can be applied to various communication systems, for example, a long term evolution (LTE) system, a centralized unit (CU)-distributed unit (DU) scenario in LTE, an LTE frequency division duplex FDD) system, an LTE time division duplex (TDD) system, a universal mobile telecommunication system (UMTS), a worldwide interoperability for microwave access (WiMAX) communication system, a fifth generation (5th generation, 5G) system or new radio (NR), a CU-DU scenario in 5G.

Figure 1:
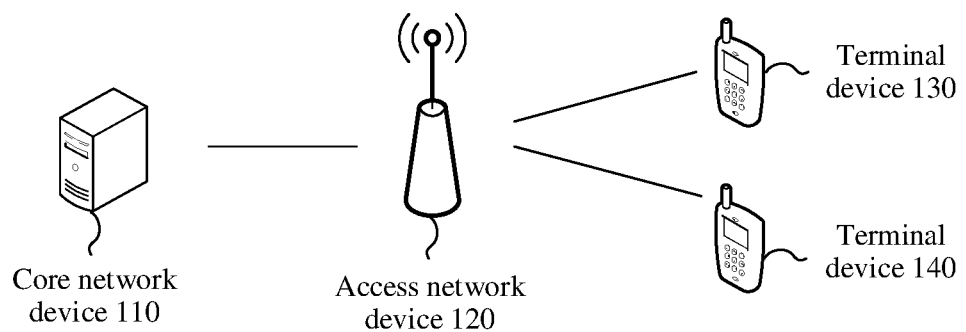
FIG. 1 is a schematic diagram of an architecture of a communication system to which an embodiment of this application is applied.

FIG. 1 is a schematic diagram of an architecture of a mobile communication system to which an embodiment of this application is applied. As shown in FIG. 1, the mobile communication system includes a core network device no, an access network device 120, and at least one terminal device (for example, a terminal device 130 and a terminal device 140 in FIG. 1). The terminal device connects to the access network device in a wireless manner, and the access network device connects to the core network device in a wireless or wired manner. The core network device and the access network device may be different physical devices that are independent of each other, or functions of the core network device and logical functions of the access network device may be integrated into a same physical device, or some functions of the core network device and some functions of the access network device may be integrated into one physical device. The terminal device may be at a fixed location or may be movable. FIG. 1 is merely a schematic diagram. The communication system may further include another network device, for example, may further include a wireless relay device and a wireless backhaul device, which are not shown in FIG. 1. A quantity of core network devices, a quantity of radio access network devices, and a quantity of terminal devices included in the mobile communication system are not limited in this embodiment of this application.

An access network may be an access network that uses different access technologies. Currently, there are two types of radio access technologies: a third generation partnership project (3rd Generation Partnership Project, 3GPP) access technology (for example, a radio access technology used in a 3G, 4G, or 5G system) and a non-3GPP access technology. The 3GPP access technology is an access technology that complies with a 3GPP standard specification. An access network using the 3GPP access technology is referred to as a radio access network (RAN), and an access network device in the 5G system is referred to as a next generation node base station (gNB). The non-3GPP access technology is an access technology that does not comply with the 3GPP standard specification, for example, an air interface technology represented by a Wi-Fi access point (AP). An access network that implements a network access function based on a wireless communication technology may be referred to as a radio access network (RAN). A 5G radio access network of a third generation partnership project (3rd Generation Partnership Project, 3GPP) may be referred to as a next generation radio access network (NG-RAN).

The access network device is an access device used by the terminal device to access the mobile communication system in a wireless manner. The access network device may be a radio access network RAN device, a base station NodeB, an evolved NodeB (eNB), the next generation Node Base station gNB in the 5G mobile communication system, a transmission point, a base station in a future mobile communication system or an access node in a wireless fidelity (Wi-Fi) system, one or a group of antenna panels (including a plurality of antenna panels) of a base station in the 5G system, or may be a network node that constitutes the gNB or the transmission point, for example, a baseband unit (BBU) or a distributed unit DU. A specific technology and a specific device form used for the access network device are not limited in embodiments of this application. In some deployments, the gNB may include a CU and the DU. The gNB may further include an active antenna unit (AAU). The CU implements some functions of the gNB, and the DU implements some functions of the gNB. For example, the CU is responsible for processing a non-real-time protocol and service, to implement functions of radio resource control (RRC) and a packet data convergence protocol (DCP) layer. The DU is responsible for processing a physical layer protocol and a real-time service, to implement functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from the information at the PHY layer. Therefore, in this architecture, higher layer signaling such as RRC layer signaling may also be considered as being sent by the DU or sent by the DU and the AAU. It may be understood that a network device may be a device including one or more of a CU node, a DU node, and an AAU node. In addition, the CU may be classified as a network device in the access network, or the CU may be classified as a network device in a core network (core network, CN). This is not limited herein.

The terminal device may also be referred to as a terminal, user equipment (UE), a mobile station (MS), a mobile terminal (MT), or the like. The terminal device may be a mobile phone, a tablet computer (Pad), a computer having a wireless transceiver function, a virtual reality (VR) terminal device, an augmented reality (AR) terminal device, a wireless terminal in industrial control, a wireless terminal in self-driving (self driving), a wireless terminal in remote medical surgery, a wireless terminal in a smart grid, a wireless terminal in transportation safety, a wireless terminal in a smart city, a wireless terminal in a smart home, or the like.

The access network device and the terminal device may be deployed on land, including being deployed indoor or outdoor, or being handheld or vehicle-mounted; may be deployed on water; or may be deployed on an airplane, a balloon, and a satellite in the air. Application scenarios of the radio access network device and the terminal device are not limited in embodiments of this application.

Embodiments of this application can be applied to downlink signal transmission, or can be applied to uplink signal transmission, or can be applied to device-to-device (device to device, D2D) signal transmission. For downlink signal transmission, a sending device is the radio access network device, and a corresponding receiving device is the terminal device. For uplink signal transmission, a sending device is the terminal device, and a corresponding receiving device is the radio access network device. For D2D signal transmission, a sending device is a terminal device, and a corresponding receiving device is also a terminal device. A signal transmission direction is not limited in embodiments of this application.

Communication between the access network device and the terminal device and communication between the terminal devices may be performed by using a licensed spectrum, or an unlicensed spectrum, or both a licensed spectrum and an unlicensed spectrum. Communication between the access network device and the terminal device and communication between the terminal devices may be performed by using a spectrum below 6 gigahertz (GHz), or a spectrum above 6G, or both a spectrum below 6G and a spectrum above 6G. A spectrum resource used between the access network device and the terminal device is not limited in embodiments of this application.

In embodiments of this application, the terminal device or the network device includes a hardware layer, an operating system layer running above the hardware layer, and an application layer running above the operating system layer.

The hardware layer includes hardware such as a central processing unit (CPU), a memory management unit (MMU), and a memory (also referred to as a main memory). An operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in embodiments of this application is not specifically limited in embodiments of this application, provided that a program that records code of the method provided in embodiments of this application can be run to perform communication according to the method provided in embodiments of this application. For example, the execution body of the method provided in embodiments of this application may be the terminal device or the network device, or a function module that is in the terminal device or the network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk drive, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry instructions and/or data.

Figure 2:
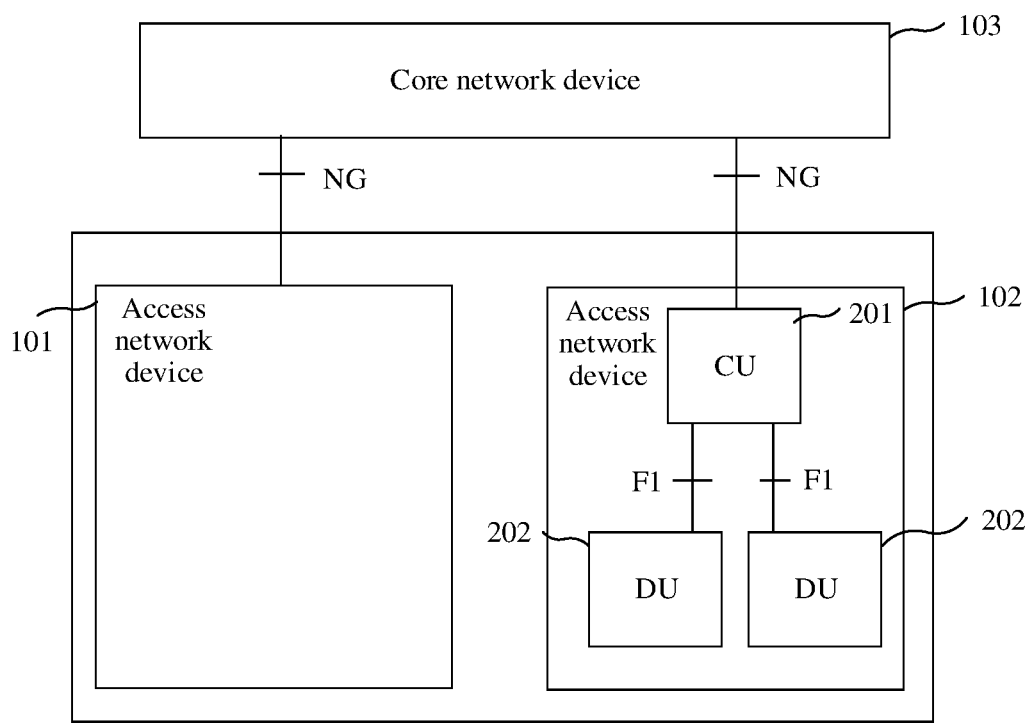
FIG. 2 is a schematic diagram of another architecture of a communication system to which an embodiment of this application is applied.

FIG. 2 is a schematic diagram of another communication architecture to which an embodiment of this application is applied. As shown in FIG. 2, a core network device 103, for example, a fifth generation core network (5th generation core network, 5GC) may connect to a complete access network device 101, such as a gNB, or may connect to an access network device 102 that includes a centralized unit (CU) 201 and a distributed unit (DU) 202. It may be understood that the CU 201 and the DU 202 may be physical entities, or may be software-based or virtualized units (or modules). It may be further understood that the CU 201 and the DU 202 may be deployed on a same device, or may be deployed on different devices. This is not limited.

The CU 201 and the DU 202 may be software-based or virtualized. Radio access network functions that need to be flexibly combined run in the CU 201, for example, functions at higher layers such as a service data adaptation protocol (SDAP) layer, a packet data convergence protocol (PDCP) layer, and a radio resource control (RRC) layer. RAN functions that are closely related to hardware and that have a high requirement on real-time performance run in the DU 202, for example, functions at lower layers such as a radio link control (RLC) layer, a physical layer (PHY), and a media access control (MAC) layer.

The CU 201 and the DU 202 are connected to each other through a communication interface. The CU 201 and the core network device are also connected to each other through a communication interface. In this embodiment of this application, the communication interface between the CU 201 and the DU 202 may be referred to as an F1 interface. The interface between the CU 201 and the core network device may be referred to as an N2 interface or an NG interface. As shown in FIG. 2, one access network device 102 may include one CU 201 and one or more DUs 202. The CU 201 and the DU 202 are connected to each other through the F1 interface. One DU 202 can be connected to only one CU 201, and one CU 201 may be connected to one or more DUs 202.

For example, the access network device 102 is a gNB. The gNB may include one or more gNB-DUs and one gNB-CU. One gNB-DU is connected to one gNB-CU, and one gNB-CU may be connected to a plurality of gNB-DUs. The gNB-CU and the gNB-DUs that are connected to the gNB-CU are considered as one gNB by other gNBs and 5GCs.

Figure 3:
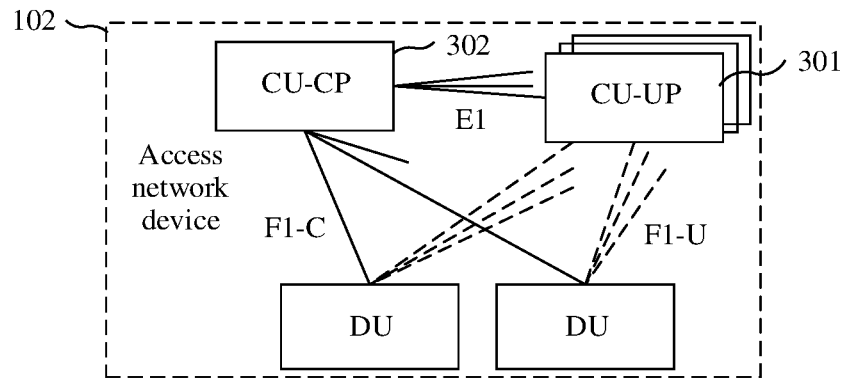
FIG. 3 is a schematic diagram of still another architecture of a communication system to which an embodiment of this application is applied.

Based on the architecture in FIG. 2, a new architecture is provided in FIG. 3. To be specific, in the CU part, the CU is divided into a centralized unit—user plane (CU-UP) 301 and a centralized unit-control plane (CU-CP) 302. The CU-UP 301 and the CU-CP 302 may be on different physical devices. There may be an open interface between the CU-UP 301 and the CU-CP 302, and the interface may be referred to as an E1 interface. In addition, there may be an interface between the DU and each of the CU-UP 301 and the CU-CP 302. For example, an interface between the CU-CP 302 and the DU is an F1-C interface, and an interface between the CU-UP 301 and the DU is an F1-U interface.

An architecture in FIG. 3 may have the following features: One access network device 102 may include one CU-CP 302, one or more CU-UPs 302, and a plurality of DUs. One DU may be connected to one CU-CP 302. One CU-UP 301 can be connected to only one CU-CP 302. One DU may be connected to a plurality of CU-UPs 301 under control of one CU-CP 302. One CU-UP 301 may be connected to a plurality of DUs under control of one CU-CP 302.

For example, the access network device 102 is a gNB. One gNB-DU and one gNB-CU-UP are both connected to only one gNB-CU-CP. Under control of one gNB-CU-CP, one gNB-DU may be connected to a plurality of gNB-CU-UPs, and one gNB-CU-UP may be connected to a plurality of gNB-DUs.

It may be understood that the communication systems in FIG. 1 to FIG. 3 are merely described as examples, and do not constitute a limitation on the protection scope of embodiments of this application. The technical solutions in embodiments of this application can also be applied to another communication system.

In a current network planning or network optimization process, how to transmit a cell coverage state in a CU-DU split scenario is not considered. This application provides a communication method, to implement transmission of a cell coverage state indicator in a CU-DU split architecture, which improves network performance.

Figure 4:
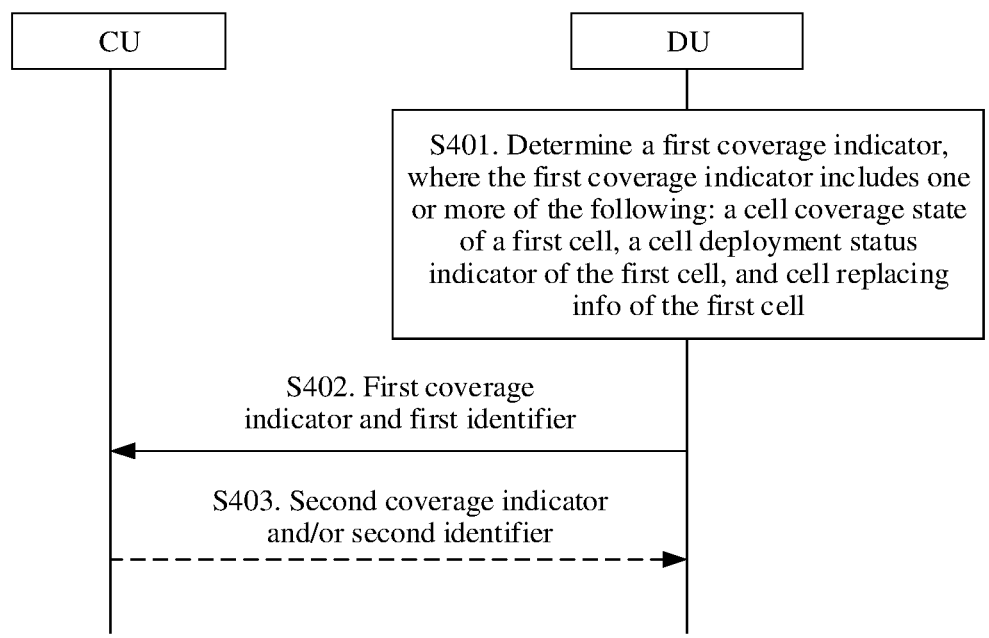
FIG. 4 is a schematic interaction diagram of a communication method according to an embodiment of this application.

FIG. 4 is a schematic interaction diagram of a communication method 400 according to an embodiment of this application. It may be understood that some or all of information exchanged between a CU and a DU in FIG. 4 may be carried in an existing message, channel, signal, or existing signaling, or may be carried in a newly defined message, channel, signal, or newly defined signaling. This is not specifically limited. For example, some or all information exchanged between the CU and the DU may be carried in an existing F1 interface message, or may be carried in a newly defined F1 interface message. It may be further understood that a first network device in the following may be the foregoing access network device, for example, the access network device 120 in FIG. 1, the access network device 101 or the access network device 102 in FIG. 2, or the access network device in FIG. 3. As shown in FIG. 4, the method 400 includes the following steps.

S401. A distributed unit DU of the first network device determines a first coverage indicator. The first coverage indicator includes one or more of the following: a cell coverage state of a first cell, a cell deployment status indicator of the first cell, and cell replacing info of the first cell.

In other words, the DU of the first network device may determine some or all of the following three types of information (alternatively, the three types of information may be referred to as three sub-information elements (IEs)) of the first cell: the cell coverage state of the first cell, the cell deployment status indicator of the first cell, and the cell replacing info of the first cell. Each sub-information element is explained below.

A cell coverage state is used to indicate whether a cell under a DU is active. For example, "o" indicates that the cell is inactive. Another value indicates that the cell is active and indicates a coverage configuration of the cell. The coverage configuration of the cell is based on specific implementation, and may not be defined in a standard.

A cell deployment status indicator is used to indicate a deployment status of a cell under a DU, for example, an indicator used for cell coverage state deployment in a next reconfiguration.

Cell replacing info is used to indicate to replace a cell identifier of a first cell, and may replace all or part of coverage of a cell to be modified. For example, the cell replacing info includes a global identifier of a cell. It should be noted that a quantity of replacing cells is not limited in this embodiment of this application. To be specific, the cell replacing info of the first cell may include related information of one or more replacing cells. This is not limited.

S402. The DU of the first network device sends the first coverage indicator and a first identifier to the centralized unit CU of the first network device. The first identifier is used to identify the first cell. Correspondingly, the CU of the first network device receives the first coverage indicator and the first identifier from the DU of the first network device.

The first identifier corresponds to the first coverage indicator. The first identifier is identifier information of the first cell. For example, the first identifier is a physical cell ID (PCI), a cell global identifier (CGI), or the like.

For general description, in embodiments of this application, identifier information of a cell (whether a first cell, a second cell, or a replacing cell) may include a cell global identifier. In LTE, the cell global identifier may be represented by an ECGI, where E is short for an evolved UMTS terrestrial radio access network (E-UTRAN). In NR, the cell global identifier may be represented by a CGI, or may be represented by an NRCGI. To avoid redundancy, a meaning of a cell global identifier in the following sections is not described in detail.

In this embodiment of this application, the DU of the first network device sends some or all of the sub-information elements in the first coverage indicator and the first identifier to the CU of the first network device, so as to implement transmission of a cell coverage state indicator in a CU-DU split architecture, which improves network performance.

Optionally, the method 400 further includes: S403. The CU of the first network device sends a second coverage indicator and/or a second identifier to the DU of the first network device. The second coverage indicator includes one or more of the following: a cell coverage state of a second cell, a cell deployment status indicator of the second cell, and cell replacing info of the second cell. The second identifier is used to identify the second cell. Correspondingly, the DU of the first network device receives the second coverage indicator and/or the second identifier from the CU of the first network device. The second coverage indicator is a coverage configuration corresponding to a neighbor cell, and the second identifier is used to identify the neighbor cell.

In other words, when the CU of the first network device obtains the coverage configuration of the neighbor cell, the CU of the first network device may send the coverage configuration of the neighbor cell, for example, the second coverage indicator and/or the second identifier, to the DU of the first network device. Herein, for specific description of sub-information elements included in the second coverage indicator, refer to the first coverage indicator. For brevity, details are not described herein again.

Optionally, the second coverage indicator and/or the second identifier may be obtained by the first network device from a second network device. The second network device is a neighbor base station. Specifically, for example, the CU of the first network device may receive the second coverage indicator and/or the second identifier sent by the neighbor base station, and may obtain a coverage state of the neighbor cell, to adjust an antenna-related parameter and the like based on the coverage state of the neighbor cell.

Optionally, the CU of the first network device may send the second coverage indicator and/or the second identifier to the DU of the first network device by using an existing interface message or a newly defined message. For example, the existing message may be an existing F1 interface message, including a GNB-DU CONFIGURATION UPDATE ACKNOWLEDGE message and a GNB-CU CONFIGURATION UPDATE message. The following describes the second coverage indicator and the second identifier with reference to Table 1.

TABLE 1

| IE/Group name (IE/Group Name) | Semantics description (Semantics description) |
|---|---|
| Neighbor cell coverage modification list (Neighbor cell coverage modification list) | List of neighbor cells with modified coverage |
| >CGI Cell global identifier | CGI of a cell to be modified |
| >Cell coverage state (Cell coverage state) | "o" indicates that a cell is inactive, another value indicates that the cell is active and indicates a coverage configuration of the cell |
| >Cell deployment status indicator (Cell deployment status indicator) | Used for cell coverage state deployment in a next reconfiguration |
| >Cell replacing info (Cell replacing info) | |
| >>Replacing cells | |
| >>>CGI | Cell global identifier, which may replace all or part of coverage of the cell to be modified |

In the foregoing Table 1, NR is used as an example. The second coverage indicator and the second identifier are described by using content included in the neighbor cell coverage modification list in Table 1. For example, it can be learned from the third row of Table 1 that the second identifier is the CGI, indicating a CGI of a cell to be modified. It can be learned from the fourth row to the sixth row in Table 1 that the second coverage indicator includes three sub-information elements: the cell coverage state, the cell deployment status indicator, and the cell replacing info. It can be learned from the seventh row and the eighth row in Table 1 that the cell replacing info includes information about a replacing cell. For example, the information about the replacing cell includes identifier information of the replacing cell. For example, the identifier information of the replacing cell may be a CGI.

It may be understood that NR is used as an example for description in Table 1, but this does not constitute a limitation on embodiments of this application. Actually, if the LTE system is used for description, the CGI may be replaced with the ECGI.

It may be understood that the foregoing Table 1 is merely an example, and does not constitute a limitation on embodiments of this application. Actually, the information element names in Table 1 may have other definitions, and this is not specifically limited.

In this embodiment of this application, the DU of the first network device may determine some or all of the sub-information elements in the first coverage indicator. The following separately describes possible implementations.

In a possible implementation, the first coverage indicator that is determined by the DU of the first network device includes the cell coverage state of the first cell, the cell deployment status indicator of the first cell, and the cell replacing info of the first cell. That is, the DU of the first network device may determine the first coverage indicator including the cell coverage state of the first cell, the cell deployment status indicator of the first cell, and the cell replacing info of the first cell, and send the first coverage indicator and the first identifier to the CU of the first network device. For ease of description, the cell coverage state of the first cell, the cell deployment status indicator of the first cell, and the cell replacing info of the first cell are referred to herein as three sub-information elements.

Optionally, the DU of the first network device may send the first coverage indicator and the first identifier to the CU of the first network device by using an existing interface message or a newly defined message. The first coverage indicator includes the foregoing three sub-information elements. For example, the existing message may be an existing F1 interface message, including a GNB-DU CONFIGURATION UPDATE message or a GNB-CU CONFIGURATION UPDATE ACKNOWLEDGE message. The following describes the first coverage indicator and the first identifier with reference to Table 2.

TABLE 2

| IE/Group name (IE/Group Name) | Semantics description (Semantics description) |
|---|---|
| Coverage modification list (Coverage Modification List) | List of cells with modified coverage (List of cells with modified coverage) |
| >CGI | CGI of a cell to be modified |
| >Cell coverage state | "o" indicates that a cell is inactive, another value indicates that the cell is active and indicates a coverage configuration of the cell |
| >Cell deployment status indicator | Used for cell coverage state deployment in a next reconfiguration |
| >Cell replacing info | |
| >>Replacing cells | |
| >>>CGI | Cell global identifier, which may replace all or part of coverage of the cell to be modified |

In the foregoing Table 2, NR is used as an example. The first coverage indicator and the first identifier are described by using content included in the coverage modification list. For example, it can be learned from the third row of Table 2 that the first identifier is the CGI, indicating a CGI of a cell to be modified (for example, the first cell is a cell to be modified). It can be learned from the fourth row to the sixth row in Table 2 that the first coverage indicator includes three sub-information elements: the cell coverage state, the cell deployment status indicator, and the cell replacing info. It can be learned from the seventh row and the eighth row in Table 2 that the cell replacing info includes identifier information of a replacing cell. For example, the identifier information of the replacing cell may be a CGI.

It may be understood that NR is used as an example for description in Table 2, but this does not constitute a limitation on embodiments of this application. Actually, if the LTE system is used for description, the CGI may be replaced with the ECGI.

It may be understood that the foregoing Table 2 is merely an example, and does not constitute a limitation on embodiments of this application. Actually, the information element names in Table 1 may have other definitions, and this is not specifically limited.

In another possible implementation, the first coverage indicator that is determined by the DU of the first network device includes the cell coverage state of the first cell and the cell deployment status indicator of the first cell. The cell replacing info of the first cell is determined by the CU of the first network device.

Optionally, the method 400 further includes: The CU of the first network device sends a third coverage indicator and the first identifier to the DU of the first network device. The third coverage indicator includes the cell replacing info of the first cell. Optionally, the cell replacing info of the first cell may include a third identifier, and the third identifier is used to identify a third cell. The third cell is a replacing cell of the first cell.

To be specific, the DU of the first network device determines the cell coverage state of the first cell and the cell deployment status indicator of the first cell in the foregoing three sub-information elements. The CU of the first network device determines the cell replacing info of the first cell in the foregoing three sub-information elements. Herein, when sending the third coverage indicator to the DU of the first network device, the CU of the first network device further needs to send the first identifier, so that the DU learns that content included in the third coverage indicator is also related to the first cell, that is, the third coverage indicator includes the cell replacing info of the first cell that is identified by the first identifier.

The third cell being the replacing cell of the first cell may be understood by using the following example. For example, if the first cell is a cell A, and the third cell is a cell B, the cell A is replaced with the cell B.

It may be understood that the foregoing description is provided only by using an example in which the third cell is the replacing cell of the first cell, and does not constitute a limitation on the protection scope of embodiments of this application. Actually, the replacing cell of the first cell may include one or more cells.

For example, the CU of the first network device receives the first coverage indicator sent by the DU of the first network device, determines the third coverage indicator, and sends the third coverage indicator and the first identifier to the DU of the first network device.

Optionally, the DU of the first network device may send the first coverage indicator and the first identifier to the CU of the first network device by using an existing interface message or a newly defined message. The first coverage indicator includes the cell coverage state of the first cell and the cell deployment status indicator of the first cell. For example, the existing message may be an existing F1 interface message, including a GNB-DU CONFIGURATION UPDATE message or a GNB-CU CONFIGURATION UPDATE ACKNOWLEDGE message. The following describes the first coverage indicator and the first identifier with reference to Table 3.

TABLE 3

| IE/Group name (IE/Group Name) | Semantics description (Semantics description) |
| --- | --- |
| Coverage modification list (Coverage Modification List) | List of cells with modified coverage |
| >CGI | CGI of a cell to be modified |
| >Cell coverage state | "o" indicates that a cell is inactive, another value indicates that the cell is active and indicates a coverage configuration of the cell |
| >Cell deployment status indicator | Used for cell coverage state deployment in a next reconfiguration |

In the foregoing Table 3, NR is used as an example. The first coverage indicator and the first identifier are described by using content included in the coverage modification list. For example, it can be learned from the third row of Table 3 that the first identifier is the CGI, indicating a CGI of a cell to be modified (for example, the first cell is a cell to be modified). It can be learned from the fourth row and the fifth row in Table 3 that the first coverage indicator includes two sub-information elements: the cell coverage state and the cell deployment status indicator. It can be learned that a difference between Table 2 and Table 3 lies in that Table 3 does not include the cell replacing info.

It may be understood that NR is used as an example for description in Table 3, but this does not constitute a limitation on embodiments of this application. Actually, if the LTE system is used for description, the CGI may be replaced with the ECGI. It may be understood that the foregoing Table 3 is merely an example, and does not constitute a limitation on embodiments of this application. Actually, the information element names in Table 2 may have other definitions, and this is not specifically limited.

Optionally, the sending, by the CU of the first network device, the third coverage indicator and the first identifier to the DU of the first network device includes: sending, by the CU of the first network device, the third coverage indicator and the first identifier to the DU of the first network device by using an existing interface message or a newly defined message. For example, the existing message may be an existing F1 interface message, including a GNB-DU CONFIGURATION UPDATE message or a GNB-CU CONFIGURATION UPDATE ACKNOWLEDGE message. The following describes the third coverage indicator and the first identifier with reference to Table 4.

TABLE 4

| IE/Group name (IE/Group Name) | Semantics description (Semantics description) |
| --- | --- |
| Coverage modification list (Coverage Modification List) | List of cells with modified coverage |

TABLE 4-continued

| IE/Group name (IE/Group Name) | Semantics description (Semantics description) |
| --- | --- |
| >CGI | CGI of a cell to be modified |
| >Cell replacing info | |
| >>Replacing cells | |
| >>>CGI | Cell global identifier, which may replace all or part of coverage of the cell to be modified |

In the foregoing Table 4, NR is used as an example. The third coverage indicator and the first identifier are described by using content included in the coverage modification list. For example, it can be learned from the third row of Table 4 that the first identifier is the CGI, indicating a CGI of a cell to be modified (for example, the first cell is a cell to be modified). It can be learned from the fourth row to the sixth row in Table 4 that the third coverage indicator includes the sub-information element: the cell replacing info, that is, the cell replacing info. The cell replacing info includes identifier information of a replacing cell. For example, the identifier information of the replacing cell may be a CGI.

It can be learned from Table 4 that, when sending the cell replacing info to the DU of the first network device, the CU of the first network device may further carry the CGI, that is, the cell global identifier of the cell to be modified.

It may be understood that NR is used as an example for description in Table 4, but this does not constitute a limitation on embodiments of this application. Actually, if the LTE system is used for description, the CGI may be replaced with the ECGI. It may be understood that the foregoing Table 4 is merely an example, and does not constitute a limitation on embodiments of this application. Actually, the information element names in Table 3 may have other definitions, and this is not specifically limited.

It should be understood that the foregoing description is provided only by using an example in which the DU of the first network device determines the cell coverage state of the first cell and the cell deployment status indicator of the first cell, and the CU of the first network device determines the cell replacing info of the first cell, but this does not constitute a limitation on embodiments of this application. Actually, the DU of the first network device may determine any one or two of the following: the cell coverage state of the first cell, the cell deployment status indicator of the first cell, and the replacing information of the first cell. Then, the CU of the first network device determines other items. This is not limited.

It may be understood that, in this embodiment of this application, after the CU of the first network device obtains the cell coverage state of the first cell, the cell deployment status indicator of the first cell, and the replacing information of the first cell, the CU of the first network device may send them to the neighbor base station. For example, for the neighbor base station, if the neighbor base station also has the CU-DU architecture, the CU of the first network device sends a fourth coverage indicator to a CU of the second network device. The fourth coverage indicator includes one or more of the following: the cell coverage state of the first cell, the cell deployment status indicator of the first cell, the replacing info of the first cell, and the first identifier. Certainly, the CU of the second network device may also send the fourth coverage indicator to a DU managed by the CU of the second network device. Optionally, the CU of the second network device may further send the first identifier to the DU of the second network device. The first identifier corresponds to the fourth coverage indicator.

For example, the CU of the first network device is a CU 1, the CU of the second network device is a CU 2. The CU 2 includes a DU 1 and a DU 2. The CU 2 may send the fourth coverage indicator to the DU 1 and the DU 2.

In this embodiment of this application, the DU of the first network device may determine one or more items of the first coverage indicator, and provide the first coverage indicator to the CU of the first network device, so as to implement transmission of the cell coverage state indicator in the CU-DU split architecture, which improves network performance.

This application further provides a communication method. In the communication method, a CU of a first network device may determine a first coverage indicator, and send the first coverage indicator and a first identifier to a DU of the first network device.

Figure 5:
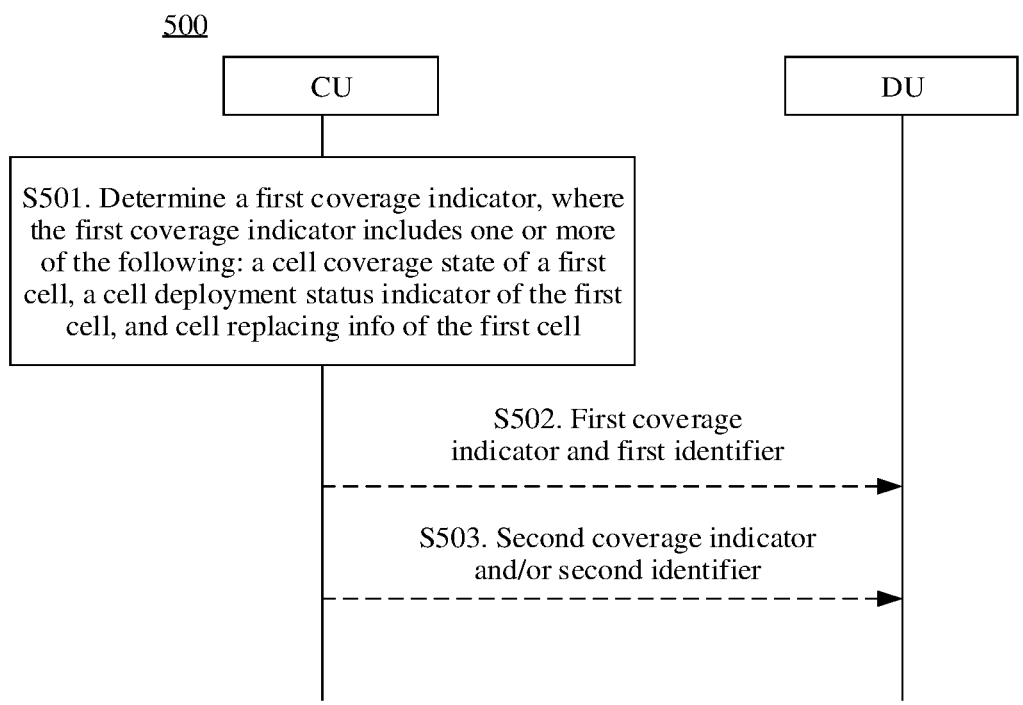
FIG. 5 is a schematic interaction diagram of another communication method according to an embodiment of this application.

FIG. 5 is a schematic interaction diagram of a communication method 500 according to another embodiment of this application. It may be understood that some or all of information exchanged between the CU and the DU in FIG. 5 may be carried in an existing message, channel, signal, or existing signaling, or may be carried in a newly defined message, channel, signal, or newly defined signaling. This is not specifically limited. For example, some or all information exchanged between the CU and the DU may be carried in an existing F1 interface message, or may be carried in a newly defined F1 interface message. As shown in FIG. 5, the method 500 includes the following steps.

S501. The centralized unit CU of the first network device determines the first coverage indicator. The first coverage indicator includes one or more of the following: a cell coverage state of a first cell, a cell deployment status indicator of the first cell, and cell replacing info of the first cell.

It should be noted that, for related description of the first coverage indicator, refer to the foregoing description. To avoid redundancy, details are not described herein again.

Optionally, the first coverage indicator includes the cell coverage state of the first cell, the cell deployment status indicator of the first cell, and the cell replacing info of the first cell. That is, all content included in the first coverage indicator may be determined by the CU.

Optionally, the CU may determine some of the following three types of information (alternatively, the three types of information may be referred to as three sub-information elements (IEs)) of the first cell: the cell coverage state of the first cell, the cell deployment status indicator of the first cell, and the cell replacing info of the first cell. The rest part is determined by the DU. For specific description of determining by the DU, refer to the description in the method 400.

Optionally, S502. The CU of the first network device sends the first coverage indicator and the first identifier to the DU of the first network device. The first identifier is used to identify the first cell. Correspondingly, the DU of the first network device receives the first coverage indicator and the first identifier from the CU of the first network device.

It may be understood that the CU of the first network device may also send the first coverage indicator and the first identifier to the DU of the first network device by using an existing interface message or a newly defined message. The first coverage indicator includes the foregoing three sub-information elements. For example, the existing message may be an existing F1 interface message, including a GNB-DU CONFIGURATION UPDATE ACKNOWLEDGE message and a GNB-CU CONFIGURATION UPDATE message.

The following describes the first coverage indicator and the first identifier with reference to Table 5.

TABLE 5

| IE/ Group name | Semantics description |
| --- | --- |
| Coverage modification list | List of cells with modified coverage |
| >CGI | CGI of a cell to be modified |
| >Cell coverage state | "o" indicates that a cell is inactive, another value indicates that the cell is active and indicates a coverage configuration of the cell |
| >Cell deployment status indicator | Used for cell coverage state deployment in a next reconfiguration |
| >Cell replacing info | |
| >>Replacing cells | |
| >>>CGI | Cell global identifier, which may replace all or part of coverage of the cell to be modified |

In the foregoing Table 5, NR is used as an example. The first coverage indicator and the first identifier are described by using content included in the coverage modification list. For example, it can be learned from the third row of Table 5 that the first identifier is the CGI, indicating a CGI of a cell to be modified (for example, the first cell is a cell to be modified). It can be learned from the fourth row to the sixth row in Table 5 that the first coverage indicator includes three sub-information elements: the cell coverage state, the cell deployment status indicator, and the cell replacing info. It can be learned from the seventh row and the eighth row in Table 5 that the cell replacing info includes identifier information of a replacing cell. For example, the identifier information of the replacing cell may be a CGI.

It may be understood that NR is used as an example for description in Table 5, but this does not constitute a limitation on embodiments of this application. Actually, if an LTE system is used for description, the CGI may be replaced with an ECGI.

It may be understood that the foregoing Table 5 is merely an example, and does not constitute a limitation on embodiments of this application. Actually, the information element names in Table 1 may have other definitions, and this is not specifically limited.

Optionally, the method 500 further includes: S503. The CU of the first network device sends a second coverage indicator and/or a second identifier to the DU of the first network device. The second coverage indicator includes one or more of the following: a cell coverage state of a second cell, a cell deployment status indicator of the second cell, and cell replacing info of the second cell. The second identifier is used to identify the second cell. Correspondingly, the DU of the first network device receives the second coverage indicator and/or the second identifier from the CU of the first network device. The second coverage indicator is a coverage configuration corresponding to a neighbor cell, and the second identifier is used to identify the neighbor cell. Herein, for description about sending, by the CU of the first network device, the second coverage indicator and/or the second identifier of a neighbor base station to the DU of the first network device, refer to description in the foregoing method 400. To avoid redundancy, details are not described herein again.

It may be understood that, in the method 500, the CU of the first network device may also send the second coverage indicator and/or the second identifier to the DU of the first network device by using an existing interface message or a newly defined message. For example, the existing message may be an existing F1 interface message, including a GNB-DU CONFIGURATION UPDATE ACKNOWLEDGE message and a GNB-CU CONFIGURATION UPDATE message. For the second coverage indicator and the second identifier, refer to the description in the foregoing Table 1. To avoid redundancy, details are not described herein again.

The following describes how the first network device determines the first coverage indicator.

Optionally, the method 500 further includes: The CU of the first network device obtains a plurality of coverage configurations, where S501 includes: The CU of the first network device determines the first coverage indicator for the first cell based on the plurality of coverage configurations.

The plurality of coverage configurations may be replaced with a plurality of candidate coverage states.

Optionally, the plurality of coverage configurations obtained by the CU may be a candidate coverage configuration list (or a candidate coverage configuration set). The candidate coverage configuration list includes a plurality of coverage configurations. Each coverage configuration includes one or more of the following: a cell coverage state, a cell deployment status indicator, and cell replacing info. Optionally, if the plurality of coverage configurations is based on a cell granularity, each coverage configuration may further include cell identifier information corresponding to the coverage configuration. For example, if the candidate coverage configuration list obtained by the CU is for different cells, the CU further needs to obtain a cell identifier corresponding to each coverage configuration. Optionally, the candidate configuration coverage list obtained by the CU may be a candidate coverage configuration list for one cell. Each cell under the CU has a candidate coverage configuration list. That is, for each cell, the CU determines an appropriate coverage configuration from the candidate coverage configuration list corresponding to the cell. Alternatively, optionally, the candidate configuration coverage list obtained by the CU may be a candidate coverage configuration list of the CU. To be specific, the CU obtains a candidate coverage configuration list, and determines an appropriate coverage configuration for each cell from the candidate coverage configuration list.

After obtaining the plurality of coverage configurations, the CU of the first network device may select an appropriate coverage configuration for the first cell. For example, the coverage configuration selected for the first cell is represented as the first coverage indicator.

Generally, the plurality of coverage configurations may be configured by a centralized management system, for example, an operation, administration and maintenance (OAM) system, or may be configured by another centralized management node. For content included in each coverage configuration, refer to the foregoing description. A coverage configuration for a cell can be selected in the following different manners. For example, the OAM system may determine the coverage configuration for each cell. Alternatively, for another example, the OAM system may determine the candidate coverage configuration list for each cell. Alternatively, for another example, the OAM system may determine the candidate coverage configuration list for the network device, and the network device dynamically selects a most appropriate coverage configuration for each cell served by the network device.

If an OAM system of the CU of the first network device and an OAM system of the DU of the first network device are different OAM systems, the CU of the first network device may determine the first coverage indicator in different manners, which are separately described below.

Optionally, that the CU of the first network device obtains a plurality of coverage configurations includes: The operation, administration and maintenance OAM system of the CU of the first network device configures the plurality of coverage configurations for the CU of the first network device. In other words, the OAM system of the CU of the first network device may configure the plurality of coverage configurations for the CU, and the CU of the first network device selects the appropriate coverage configuration, for example, the first coverage indicator, for the first cell from the plurality of coverage configurations. Herein, how the CU of the first network device selects the appropriate coverage configuration for the first cell from the plurality of coverage configurations is based on specific implementation of the product, and is not specifically limited herein. For example, the CU of the first network device may select the appropriate coverage configuration for the first cell based on a coverage configuration of a neighbor cell relationship.

Optionally, that the CU of the first network device obtains a plurality of coverage configurations includes: An operation, administration and maintenance OAM system of the DU of the first network device configures a plurality of coverage configurations for the DU of the first network device. The DU of the first network device sends the plurality of coverage configurations to the CU of the first network device. In other words, the OAM system of the DU of the first network device configures the plurality of coverage configurations of the cell for the DU. The DU sends the plurality of coverage configurations to the CU. The CU determines to select the appropriate coverage configuration, for example, the first coverage indicator, from the plurality of coverage configurations. In a case in which the plurality of coverage configurations are in a one-to-one correspondence with the plurality of cells, the DU needs to send the plurality of coverage configurations and the cell identifier corresponding to each coverage configuration to the CU. The CU determines to select the appropriate coverage configuration from the plurality of coverage configurations for the first cell.

Optionally, the method 500 further includes: The operation, administration and maintenance OAM system of the DU of the first network device configures the plurality of coverage configurations for the DU of the first network device. The DU of the first network device determines the first coverage indicator for the first cell from the plurality of coverage configurations. The DU of the first network device sends the first coverage indicator to the CU of the first network device. In other words, the OAM system of the DU of the first network device configures the plurality of coverage configurations of the cell for the DU. The DU selects the appropriate coverage configuration, for example, the first coverage indicator, from the plurality of coverage configurations, and sends the coverage configuration selected for the first cell to the CU. Herein, how the DU of the first network device selects the appropriate coverage configuration for the first cell from the plurality of coverage configurations is based on specific implementation of the product, and is not specifically limited herein. For example, the DU of the first network device may select the appropriate coverage configuration for the first cell based on a coverage configuration of a neighbor cell relationship.

Therefore, it can be learned from the foregoing implementations that even though the OAM system of the CU of the first network device and the OAM system of the DU of the first network device are different OAM systems, the CU of the first network device may also determine the first coverage indicator.

Optionally, in the method 500, the CU of the first network device may also send the determined cell coverage state of the first cell, the determined cell deployment status indicator of the first cell, and the determined cell replacing info of the first cell to the neighbor base station. For specific description, refer to the foregoing description. To avoid redundancy, details are not described herein again.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

It should be understood that an "embodiment" in the entire specification means that particular characteristics, structures, or features related to the embodiment are included in at least one embodiment of this application. Therefore, embodiments in the entire specification do not necessarily refer to a same embodiment. In addition, these particular features, structures, or characteristics may be combined in one or more embodiments in any appropriate manner.

It should be understood that the solutions in embodiments of this application may be appropriately combined, and explanation or description of terms in embodiments may be cross-referenced or explained in embodiments. This is not limited.

It should further be understood that sequence numbers of the foregoing processes do not mean execution sequences in various embodiments of this application. The execution sequences of the processes should be determined based on functions and internal logic of the processes. Numbers or sequence numbers in the foregoing processes are merely used for differentiation for ease of description, and should not constitute any limitation on an implementation process of embodiments of this application.

Corresponding to the methods provided in the foregoing method embodiments, an embodiment of this application further provides a corresponding apparatus. The apparatus includes a corresponding module configured to perform the foregoing embodiments. The module may be software, hardware, or a combination of software and hardware. It may be understood that the technical features described in the method embodiments are also applicable to the following apparatus embodiments.

Figure 6:
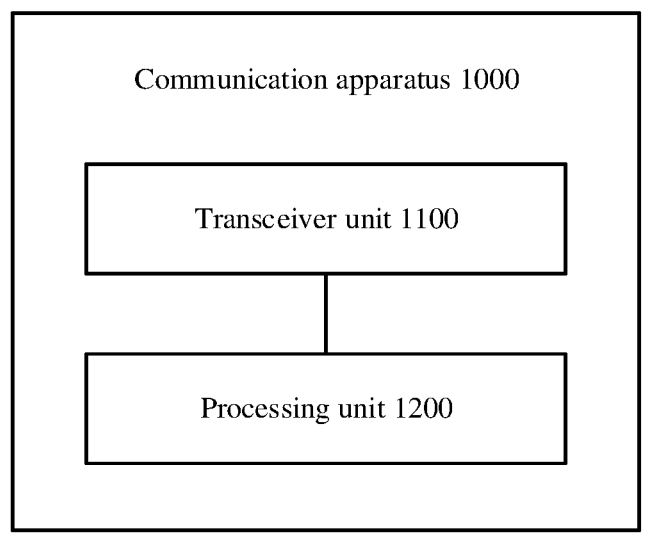
FIG. 6 is a schematic block diagram of a communication apparatus according to an embodiment of this application.

FIG. 6 is a schematic block diagram of a communication apparatus according to an embodiment of this application. As shown in FIG. 6, the communication apparatus 1000 may include a transceiver unit 1100 and a processing unit 1200.

In a possible design, the communication apparatus 1000 may correspond to the distributed unit DU in the foregoing method embodiments, for example, may be a DU entity or a chip configured in the DU entity.

Specifically, the communication apparatus 1000 may correspond to the DU in the method 400 according to an embodiment of this application. The communication apparatus 1000 may include a unit configured to perform the method that is performed by the DU in the method 400 in FIG. 4 or the method 500 in FIG. 5. In addition, units in the communication apparatus 1000 and the foregoing other operations or functions respectively implement the corresponding procedures of the DU in the method 400 in FIG. 4, or implement the corresponding procedures of the DU in the method 500 in FIG. 5.

In an implementation, the transceiver unit 1100 and the processing unit 1200 may be respectively configured to perform the following steps.

The processing unit 1200 is configured to determine a first coverage indicator. The first coverage indicator includes one or more of the following: a cell coverage state of a first cell, a cell deployment status indicator of the first cell, and cell replacing info of the first cell.

The transceiver unit 1100 is configured to send the first coverage indicator and a first identifier to a centralized unit CU of a first network device. The first identifier is used to identify a first cell.

Optionally, the transceiver unit 1100 is further configured to receive a second coverage indicator and/or a second identifier from the CU of the first network device. The second coverage indicator includes one or more of the following: a cell coverage state of a second cell, a cell deployment status indicator of the second cell, and cell replacing info of the second cell. The second identifier is used to identify the second cell.

Optionally, the first coverage indicator includes the cell coverage state of the first cell, the cell deployment status indicator of the first cell, and the cell replacing info of the first cell.

Optionally, the first coverage indicator includes the cell coverage state of the first cell and the cell deployment status indicator of the first cell. Optionally, the transceiver unit 1100 is further configured to receive a third coverage indicator and the first identifier from the CU of the first network device, where the third coverage indicator includes the cell replacing info of the first cell.

In another implementation, the transceiver unit 1100 and the processing unit 1200 may be respectively configured to perform the following steps.

The transceiver unit 1100 is configured to receive the first coverage indicator and the first identifier from the centralized unit CU of the first network device. The first coverage indicator includes one or more of the following: the cell coverage state of the first cell, the cell deployment status indicator of the first cell, and the cell replacing info of the first cell. The first identifier is used to identify the first cell.

The processing unit 1200 is configured to manage the first cell based on the first coverage indicator.

Optionally, the transceiver unit 1100 is further configured to receive the second coverage indicator and/or the second identifier from the CU of the first network device. The second coverage indicator includes one or more of the following: the cell coverage state of the second cell, the cell deployment status indicator of the second cell, and the cell replacing info of the second cell. The second identifier is used to identify the second cell.

Optionally, the processing unit 1200 is further configured to configure a plurality of coverage configurations for the DU of the first network device; and invoke the transceiver unit 1100 to send the plurality of coverage configurations to the CU of the first network device.

Optionally, the processing unit 1200 is further configured to configure the plurality of coverage configurations; determine the first coverage indicator for the first cell based on the plurality of coverage configurations; and invoke the transceiver unit 1100 to send the first coverage indicator to the CU of the first network device.

In a possible design, the communication apparatus 1000 may correspond to the centralized unit CU in the foregoing method embodiments, for example, may be a CU entity or a chip configured in the CU entity.

Specifically, the communication apparatus 1000 may correspond to the DU in the method 400 according to an embodiment of this application. The communication apparatus 1000 may include a unit configured to perform the method that is performed by the DU in the method 400 in FIG. 4 or the method 500 in FIG. 5. In addition, units in the communication apparatus 1000 and the foregoing other operations or functions respectively implement the corresponding procedures of the CU in the method 400 in FIG. 4, or implement the corresponding procedures of the CU in the method 500 in FIG. 5.

In an implementation, the transceiver unit 1100 and the processing unit 1200 may be respectively configured to perform the following steps.

The transceiver unit 1100 is configured to receive the first coverage indicator and the first identifier from the distributed unit DU of the first network device. The first coverage indicator includes one or more of the following: the cell coverage state of the first cell, the cell deployment status indicator of the first cell, and the cell replacing info of the first cell. The first identifier is used to identify the first cell.

The processing unit 1200 is configured to manage the first cell based on the first coverage indicator.

Optionally, the transceiver unit 1100 is further configured to send the second coverage indicator and/or the second identifier to the DU of the first network device. The second coverage indicator includes one or more of the following: the cell coverage state of the second cell, the cell deployment status indicator of the second cell, and the cell replacing info of the second cell. The second identifier is used to identify the second cell.

Optionally, the first coverage indicator includes the cell coverage state of the first cell, the cell deployment status indicator of the first cell, and the cell replacing info of the first cell.

Optionally, the first coverage indicator includes the cell coverage state of the first cell and the cell deployment status indicator of the first cell. The transceiver unit 1100 is further configured to send the third coverage indicator and the first identifier to the DU of the first network device. The third coverage indicator includes the cell replacing info of the first cell.

In another implementation, the transceiver unit 1100 and the processing unit 1200 may be respectively configured to perform the following steps.

The processing unit 1200 is configured to determine the first coverage indicator. The first coverage indicator includes one or more of the following: the cell coverage state of the first cell, the cell deployment status indicator of the first cell, and the cell replacing info of the first cell.

The transceiver unit 1100 is configured to send the first coverage indicator and the first identifier to the distributed unit DU of the first network device. The first identifier is used to identify the first cell.

Optionally, the transceiver unit 1100 is further configured to send the second coverage indicator and/or the second identifier to the DU of the first network device. The second coverage indicator includes one or more of the following: the cell coverage state of the second cell, the cell deployment status indicator of the second cell, and the cell replacing info of the second cell. The second identifier is used to identify the second cell.

Optionally, the processing unit 1200 is further configured to obtain the plurality of coverage configurations. The processing unit 1200 being configured to determine the first coverage indicator includes: determining the first coverage indicator for the first cell based on the plurality of coverage configurations.

Optionally, the processing unit 1200 being configured to obtain the plurality of coverage configurations includes: configuring, by the processing unit 1200, the plurality of coverage configurations.

Optionally, the processing unit 1200 being configured to obtain the plurality of coverage configurations includes: The transceiver unit 1100 receives the plurality of coverage configurations from the DU of the first network device. The plurality of coverage configurations are configured for the first network device DU by an operation, administration and maintenance OAM system of the DU of the first network device.

Optionally, the processing unit 1200 being configured to determine the first coverage indicator includes: invoking the transceiver unit 1100 to receive the first coverage indicator from the DU of the first network device. The first coverage indicator is determined by the DU of the first network device for the first cell from the plurality of coverage configurations. The plurality of coverage configurations are configured by the operation, administration and maintenance OAM system of the DU of the first network device for the DU of the first network device. It should be understood that, a specific process in which each unit performs the foregoing corresponding step has been described in detail in the foregoing method embodiments. For brevity, details are not described herein again.

It should be understood that, a specific process in which each unit performs the foregoing corresponding step has been described in detail in the foregoing method embodiments. For brevity, details are not described herein again.

Figure 8:
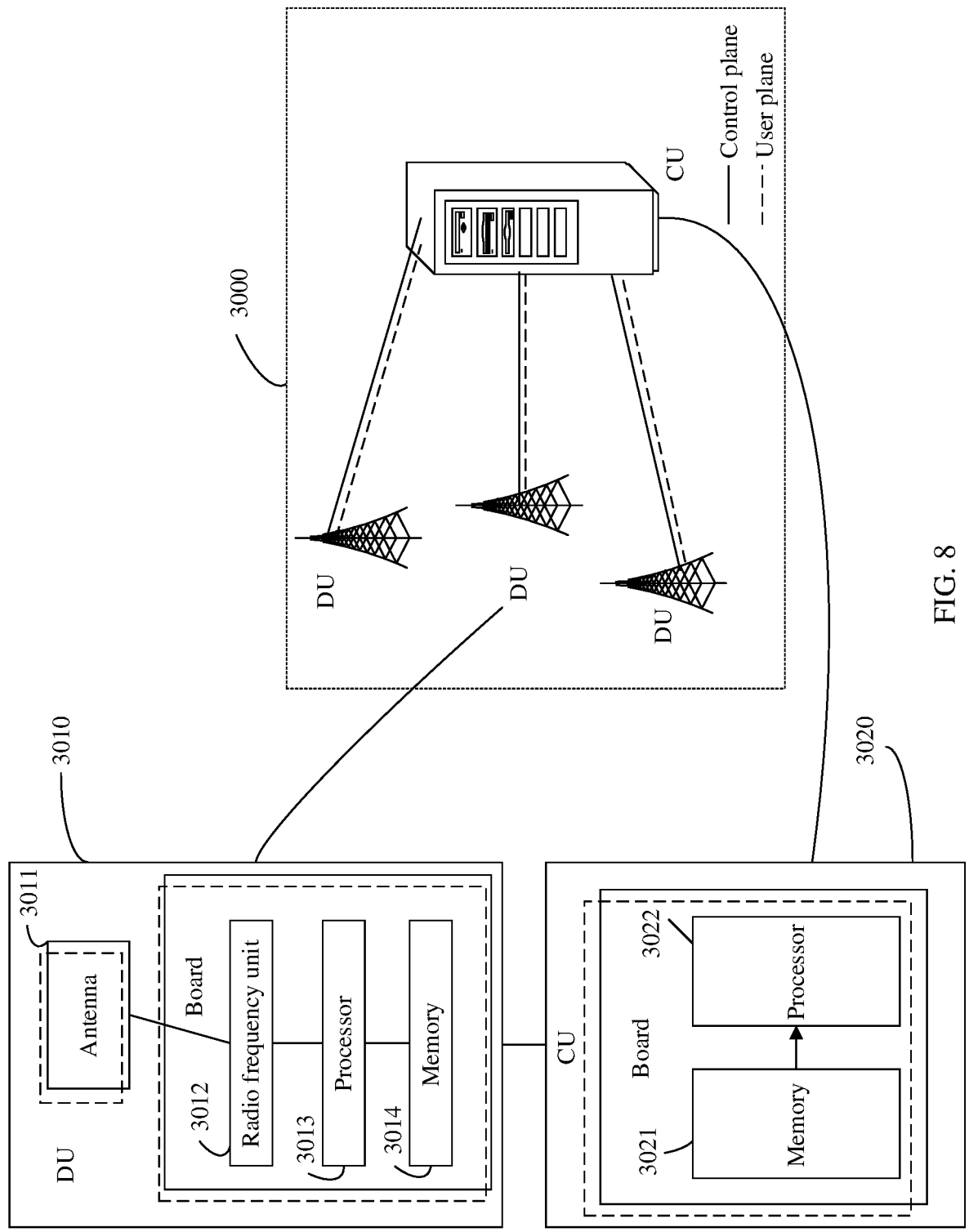
FIG. 8 is a schematic diagram of a structure of a network device according to an embodiment of this application.

It should be further understood that when the communication apparatus 1000 is a base station, the transceiver unit 1100 in the communication apparatus 1000 may correspond to a radio frequency unit 3012 and an antenna 3011 in a base station 3000 shown in FIG. 8. The processing unit 1100 in the communication apparatus 1000 may be implemented by using at least one processor. For example, the processing unit 1100 may correspond to a processor 3022 in the base station 3000 shown in FIG. 8.

It should be further understood that, when the communication apparatus 1000 is a chip configured in the network device, the transceiver unit 1200 in the communication apparatus 1000 may be an input/output interface.

Optionally, the communication apparatus 1000 further includes a storage unit. The storage unit may be configured to store instructions or data. The processing unit may invoke the instructions or the data stored in the storage unit, to implement a corresponding operation. The storage unit may be implemented by using at least one memory. For example, the memory may correspond to a memory 3201 in the base station 3000 in FIG. 8.

Figure 7:
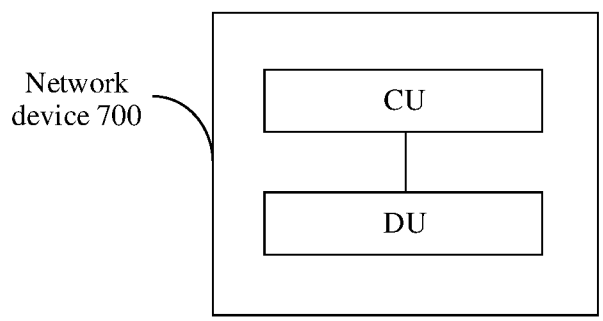
FIG. 7 is a schematic block diagram of another communication apparatus according to an embodiment of this application.

FIG. 7 is a schematic block diagram of a network device according to an embodiment of this application. As shown in FIG. 7, the network device 700 includes a distributed unit DU and a centralized unit CU. The distributed unit DU may perform steps that are performed by the DU in the method 400 in FIG. 4 or the method 500 in FIG. 5. The centralized unit CU may perform steps that are performed by the CU in the method 400 in FIG. 4 or the method 500 in FIG. 5.

It should be understood that a specific process in which the CU or the DU performs the foregoing corresponding step has been described in detail in the foregoing method embodiments. For brevity, details are not described herein again.

Optionally, the network device 700 may be implemented by using the base station 3000 in FIG. 8.

FIG. 8 is a schematic diagram of a structure of a network device according to an embodiment of this application, for example, may be a schematic diagram of a structure of the base station 3000. The base station 3000 can be applied to the system shown in FIG. 1 or FIG. 2, and performs a function of the second transceiver device or the first transceiver device in the foregoing method embodiments. As shown in the figure, the base station 3000 may include one or more DUs 3010 and one or more CUs 3020. The CU 3020 may communicate with an NG core (next generation core, NC). The DU 3010 may include at least one antenna 3011, at least one radio frequency unit 3012, at least one processor 3013, and at least one memory 3014. The DU 3010 is mainly configured to: receive or send a radio frequency signal, perform conversion between a radio frequency signal and a baseband signal, and perform partial baseband processing. The CU 3020 may include at least one processor 3022 and at least one memory 3021. The CU 3020 and the DU 3010 may communicate with each other through an interface. A control plane (CP) interface may be Fs-C, for example, F1-C, and a user plane (UP) interface may be Fs-U, for example, F1-U.

The CU 3020 is mainly configured to: perform baseband processing, control the base station, and the like. The DU 3010 and the CU 3020 may be physically disposed together, or may be physically disposed separately. To be specific, the base station is a distributed base station. The CU 3020 is a control center of the base station, or may be referred to as a processing unit. The CU 3020 is mainly configured to implement a baseband processing function. For example, the CU 3020 may be configured to control the base station to perform an operation procedure related to the access network device in the foregoing method embodiments.

Specifically, baseband processing of the CU and the DU may be divided based on a protocol layer of a wireless network. For example, functions of a PDCP layer and a layer above the PDCP layer are set on the CU, and functions of protocol layers below the PDCP layer, such as an RLC layer and a MAC layer, are set on the DU. For another example, the CU implements functions of an RRC layer and the PDCP layer, and the DU implements functions of the RLC layer, the MAC layer, and a PHY layer.

In addition, optionally, the base station 3000 may include one or more radio frequency units (RUs), one or more DUs, and one or more CUs. The DU may include at least one processor 3013 and at least one memory 3014. The RU may include at least one antenna 3011 and at least one radio frequency unit 3012. The CU may include at least one processor 3022 and at least one memory 3021.

In an example, the CU 3020 may include one or more boards. A plurality of boards may jointly support a radio access network (for example, a 5G network) of a single access standard, or may separately support radio access networks (for example, an LTE network, a 5G network, or another network) of different access standards. The memory 3021 and the processor 3022 may serve one or more boards. In other words, a memory and a processor may be separately disposed on each board. Alternatively, the plurality of boards may share a same memory and a same processor. In addition, a necessary circuit may be further disposed on each board. The DU 3010 may include one or more boards. A plurality of boards may jointly support a radio access network (for example, a 5G network) of a single access standard, or may separately support radio access networks (for example, an LTE network, a 5G network, or another network) of different access standards. The memory 3014 and the processor 3013 may serve one or more boards. In other words, a memory and a processor may be separately disposed on each board. Alternatively, the plurality of boards may share a same memory and a same processor. In addition, a necessary circuit may be further disposed on each board.

It should be understood that the base station 3000 shown in FIG. 8 can implement processes related to the DU or the CU in the method embodiment shown in FIG. 4 or FIG. 5. Operations and/or functions of the modules in the base station 3000 are respectively intended to implement the corresponding procedures in the foregoing method embodiments. For details, refer to the description in the foregoing method embodiments. To avoid repetition, detailed description is appropriately omitted herein.

It should be understood that, the base station 3000 shown in FIG. 8 is merely a possible architecture of the network device, and this shall not constitute any limitation on this application. The method provided in this application is applicable to an access network device having another architecture, for example, an access network device including a CU, a DU, and an AAU. A specific architecture of the network device is not limited in this application.

According to the methods provided in embodiments of this application, this application further provides a computer program product. The computer program product includes computer program code. When the computer program code is run on a computer, the computer is enabled to perform the method on the DU side in the embodiment shown in FIG. 4 or FIG. 5.

According to the methods provided in embodiments of this application, this application further provides a computer-readable medium. The computer readable medium stores program code. When the program code is run on a computer, the computer is enabled to perform the method on the CU side in the embodiment shown in FIG. 4 or FIG. 5.

An embodiment of this application further provides a processing apparatus including a processor and an interface. The processor is configured to perform the communication method in any one of the foregoing method embodiments.

The communication apparatus in the foregoing apparatus embodiments completely corresponds to the DU or CU in the method embodiments. A corresponding module or unit performs a corresponding step. For example, a communication unit (a transceiver) performs a receiving step or a sending step in the method embodiments, and a processing unit (a processor) may perform another step other than the sending step and the receiving step. For a function of a specific unit, refer to a corresponding method embodiment. There may be one or more processors.

A person skilled in the art may further understand that each illustrative logical block and each step that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the protection scope of embodiments of this application.

It should be understood that the processor in embodiments of this application may be an integrated circuit chip, and has a signal processing capability. In an implementation process, the steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, a discrete hardware component, a system on chip (SoC), a central processing unit (CPU), a network processor (NP), a digital signal processing circuit (DSP), a micro controller unit (MCU), a programmable controller (programmable logic device, PLD), or another integrated chip. The processor may implement or perform the methods, the steps, and the logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The technologies described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

It may be understood that, in embodiments of this application, the memory may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. Through example but not limitative description, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM). It should be noted that the memories in the system and methods described in this specification include but are not limited to these memories and any memory of another suitable type.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid-state disk (SSD)), or the like.

It should be further understood that, in this application, "when" and "if" mean that a UE or a base station performs corresponding processing in an objective situation, and are not intended to limit time, and the UE or the base station is not necessarily required to have a determining action during implementation, and do not mean any other limitation.

A person of ordinary skill in the art may understand that various numbers such as "first" and "second" in this application are merely used for differentiation for ease of description, and are not used to limit the scope of embodiments of this application or represent a sequence.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural.

The character "/" usually indicates an "or" relationship between associated objects.

The term "at least one of" in this specification indicates all or any combination of listed items. For example, "at least one of A, B, and C" may indicate the following six cases: only A exists, only B exists, only C exists, A and B coexist, B and C coexist, and A, B, and C coexist. A may be singular or plural, B may be singular or plural, and C may be singular or plural.

It should be understood that in embodiments of this application, "B corresponding to A" represents that B is associated with A, and B may be determined based on A. However, it should be further understood that determining B based on A does not mean that B is determined based on only A. B may alternatively be determined based on A and/or other information.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, appropriate deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

For general description, "predefine" in embodiments of this application may be understood as "define", "pre-define", "store", "pre-store", "pre-negotiate", "pre-configure", "solidify", or "pre-burn". The configuration in embodiments of this application may be understood as notification through RRC signaling, MAC signaling, or physical layer information, where the physical layer information may be transmitted on a PDCCH or a PDSCH.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and methods may be implemented in other manners. For example, the described apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing description is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   determining, by a distributed unit (DU) of a first network device, a first coverage indicator, wherein the first coverage indicator comprises one or more of following: a cell coverage state of a first cell, a cell deployment status indicator of the first cell, or cell replacing information of the first cell;
   sending, by the DU of the first network device, the first coverage indicator and a first identifier to a centralized unit (CU) of the first network device, the first identifier identifying the first cell; and
   receiving, by the DU of the first network device, a second coverage indicator or a second identifier from the CU of the first network device, wherein the second coverage indicator comprises one or more of following: a cell coverage state of a second cell, a cell deployment status indicator of the second cell, or cell replacing information of the second cell, and the second identifier identifying the second cell.

2. The communication method according to claim 1, wherein the first coverage indicator comprises the cell coverage state of the first cell, the cell deployment status indicator of the first cell, and the cell replacing information of the first cell.

3. The communication method according to claim 1, wherein the first coverage indicator comprises the cell coverage state of the first cell and the cell deployment status indicator of the first cell; and the communication method further comprises:
receiving, by the DU of the first network device, a third coverage indicator and the first identifier from the CU of the first network device, wherein the third coverage indicator comprises the cell replacing information of the first cell.

4. A communication method, comprising:
receiving, by a centralized unit (CU) of a first network device, a first coverage indicator and a first identifier from a distributed unit (DU) of the first network device, wherein the first coverage indicator comprises one or more of following: a cell coverage state of a first cell, a cell deployment status indicator of the first cell, or cell replacing information of the first cell, the first identifier identifying the first cell; and
managing, by the CU of the first network device, the first cell based on the first coverage indicator; and
sending, by the CU of the first network device, a second coverage indicator or a second identifier to the DU of the first network device, wherein the second coverage indicator comprises one or more of following: a cell coverage state of a second cell, a cell deployment status indicator of the second cell, or cell replacing information of the second cell, the second identifier identifying the second cell.

5. The communication method according to claim 4, wherein the first coverage indicator comprises the cell coverage state of the first cell, the cell deployment status indicator of the first cell, and the cell replacing information of the first cell.

6. The communication method according to claim 4, wherein the first coverage indicator comprises the cell coverage state of the first cell and the cell deployment status indicator of the first cell; and the communication method further comprises:
sending, by the CU of the first network device, a third coverage indicator and the first identifier to the DU of the first network device, wherein the third coverage indicator comprises the cell replacing information of the first cell.

7. A communication apparatus, comprising a distributed unit (DU) and a centralized unit (CU), wherein
the DU is configured to determine a first coverage indicator, wherein the first coverage indicator comprises one or more of following: a cell coverage state of a first cell, a cell deployment status indicator of the first cell, or cell replacing information of the first cell; and
the CU is configured to receive the first coverage indicator and a first identifier from the DU, the first identifier identifying the first cell; and
the CU is further configured to send a second coverage indicator or a second identifier to the DU, the second coverage indicator comprises one or more of following: a cell coverage state of a second cell, a cell deployment status indicator of the second cell, or cell replacing information of the second cell, the second identifier identifying the second cell.

8. The communication apparatus according to claim 7, wherein the first coverage indicator comprises the cell coverage state of the first cell, the cell deployment status indicator of the first cell, and the cell replacing information of the first cell.

9. The communication apparatus according to claim 7, wherein the first coverage indicator comprises the cell coverage state of the first cell and the cell deployment status indicator of the first cell; and the CU is further configured to send a third coverage indicator and the first identifier to the DU, wherein the third coverage indicator comprises the cell replacing information of the first cell.

10. A communication apparatus, comprising:
at least one processor; and
at least one computer readable memories storing executable instructions that are executable by the at least one processor, wherein executing the executable instructions causes the communication apparatus to implement a distributed unit (DU) and a centralized unit (CU), and to perform operations comprising:
determining, by the DU, a first coverage indicator, wherein the first coverage indicator comprises one or more of following: a cell coverage state of a first cell, a cell deployment status indicator of the first cell, or cell replacing information of the first cell;
receiving, by the CU, the first coverage indicator and a first identifier from the DU, the first identifier identifying the first cell; and
sending, by the CU, a second coverage indicator or a second identifier to the DU, the second coverage indicator comprises one or more of following: a cell coverage state of a second cell, a cell deployment status indicator of the second cell, or cell replacing information of the second cell, the second identifier identifying the second cell.

11. The communication apparatus according to claim 10, wherein the first coverage indicator comprises the cell coverage state of the first cell, the cell deployment status indicator of the first cell, and the cell replacing information of the first cell.

12. The communication apparatus according to claim 10, wherein the first coverage indicator comprises the cell coverage state of the first cell and the cell deployment status indicator of the first cell; and the CU is further configured to send a third coverage indicator and the first identifier to the DU, wherein the third coverage indicator comprises the cell replacing information of the first cell.

13. The communication method according to claim 1, wherein the cell coverage state of the first cell indicates whether the first cell under is active.

14. The communication method according to claim 1, wherein the cell deployment status indicator of the first cell comprises an indicator used for cell coverage state deployment in a next reconfiguration.

15. The communication method according to claim 1, wherein the cell replacing information of the first cell indicates to replace a cell identifier of a first cell.

16. The communication method according to claim 4, wherein the cell coverage state of the first cell indicates whether the first cell under is active.

17. The communication method according to claim 4, wherein the cell deployment status indicator of the first cell comprises an indicator used for cell coverage state deployment in a next reconfiguration.

18. The communication method according to claim 4, wherein the cell replacing information of the first cell indicates to replace a cell identifier of a first cell.

19. The communication apparatus according to claim 7, wherein the cell coverage state of the first cell indicates whether the first cell under is active.

20. The communication apparatus according to claim 7, wherein the cell deployment status indicator of the first cell comprises an indicator used for cell coverage state deployment in a next reconfiguration.

* * * * *